United States Patent
Min-Liang et al.

(10) Patent No.: US 8,547,334 B2
(45) Date of Patent: Oct. 1, 2013

(54) CUSTOMIZABLE COMPUTER INPUT DEVICE

(76) Inventors: Tan Min-Liang, Singapore (SG); Ng Chern Ann, Singapore (SG)

( * ) Notice: Subject to any disclaimer, the term of this patent is extended or adjusted under 35 U.S.C. 154(b) by 271 days.

(21) Appl. No.: 11/883,908

(22) PCT Filed: Nov. 29, 2006

(86) PCT No.: PCT/US2006/045640
§ 371 (c)(1),
(2), (4) Date: Apr. 23, 2010

(87) PCT Pub. No.: WO2008/066521
PCT Pub. Date: Jun. 5, 2008

(65) Prior Publication Data
US 2010/0231514 A1    Sep. 16, 2010

(51) Int. Cl.
*G06F 3/033* (2013.01)
(52) U.S. Cl.
USPC .......................................... 345/163; 345/156
(58) Field of Classification Search
USPC ................................................. 345/156–184
See application file for complete search history.

(56) References Cited

U.S. PATENT DOCUMENTS

| | | | | |
|---|---|---|---|---|
| 5,245,146 A * | 9/1993 | Florence | ........................ | 200/333 |
| 5,990,870 A * | 11/1999 | Chen et al. | ..................... | 345/163 |
| 6,031,522 A * | 2/2000 | Strand | ........................... | 345/163 |
| 6,072,471 A * | 6/2000 | Lo | ................................ | 345/163 |
| 6,200,219 B1 * | 3/2001 | Rudell et al. | ..................... | 463/37 |
| 6,362,811 B1 * | 3/2002 | Edwards et al. | .............. | 345/163 |
| 6,373,468 B1 * | 4/2002 | Leman | ........................... | 345/163 |
| 6,411,281 B1 * | 6/2002 | Sasselli et al. | .................. | 345/163 |
| 6,509,891 B1 * | 1/2003 | Sheehan et al. | ............... | 345/167 |
| 6,525,306 B1 * | 2/2003 | Bohn | ............................ | 250/221 |
| 6,567,073 B1 * | 5/2003 | Levin | ............................ | 345/163 |
| 6,580,420 B1 * | 6/2003 | Wang | ............................. | 345/163 |
| 6,933,925 B1 * | 8/2005 | Gibbons et al. | ............... | 345/163 |
| 7,304,636 B2 * | 12/2007 | Willat et al. | .................... | 345/163 |
| 7,576,729 B2 * | 8/2009 | Medina | ......................... | 345/158 |
| 7,609,251 B2 * | 10/2009 | Rogers | .......................... | 345/163 |
| 7,710,397 B2 * | 5/2010 | Krah et al. | ...................... | 345/163 |
| 7,755,609 B2 * | 7/2010 | Segalle | .......................... | 345/163 |
| 7,924,266 B2 * | 4/2011 | Larsen | .......................... | 345/163 |
| 8,009,138 B2 * | 8/2011 | Yasutake | ....................... | 345/156 |
| 8,111,242 B1 * | 2/2012 | Charlton et al. | ............... | 345/163 |
| 2001/0011995 A1 * | 8/2001 | Hinckley et al. | ............... | 345/156 |
| 2002/0105500 A1 * | 8/2002 | Edwards et al. | .............. | 345/163 |
| 2002/0109672 A1 * | 8/2002 | Kehlstadt et al. | ............. | 345/157 |
| 2002/0118174 A1 * | 8/2002 | Rodgers | ........................ | 345/163 |
| 2002/0126092 A1 * | 9/2002 | Tiphane et al. | ................ | 345/163 |
| 2003/0052860 A1 * | 3/2003 | Park et al. | ...................... | 345/156 |
| 2003/0160764 A1 * | 8/2003 | Kuan | ............................. | 345/163 |
| 2003/0214483 A1 * | 11/2003 | Hammer et al. | .............. | 345/163 |
| 2005/0007345 A1 * | 1/2005 | Kuan | ............................. | 345/163 |

(Continued)

FOREIGN PATENT DOCUMENTS
EP           757327 A2 *    2/1997

*Primary Examiner* — Dmitriy Bolotin
(74) *Attorney, Agent, or Firm* — Andrew G. DiNovo

(57) ABSTRACT

A customer user input device such as a computer mouse is disclosed. A core module can house the sensor, micro-controller and RF modules (if any). It may or may not also house the microswitches and scroll wheel. The core module can accept inserts having differing or variable button configurations so that the user can customize the location of the buttons in accordance with the user's intentions.

14 Claims, 5 Drawing Sheets

Interchangeable Thumb Grooves

(56) References Cited

U.S. PATENT DOCUMENTS

| | | | |
|---|---|---|---|
| 2005/0073500 A1* | 4/2005 | Philo | 345/163 |
| 2005/0146501 A1* | 7/2005 | Chen | 345/163 |
| 2006/0007145 A1* | 1/2006 | Naghi et al. | 345/163 |
| 2006/0007151 A1* | 1/2006 | Ram | 345/163 |
| 2006/0044270 A1* | 3/2006 | Chen | 345/163 |
| 2007/0046631 A1* | 3/2007 | Chang | 345/163 |
| 2008/0246727 A1* | 10/2008 | Larsen | 345/163 |
| 2009/0046064 A1* | 2/2009 | Manalo et al. | 345/164 |
| 2009/0153476 A1* | 6/2009 | Kang | 345/157 |
| 2011/0141018 A1* | 6/2011 | Du et al. | 345/163 |
| 2011/0205158 A1* | 8/2011 | Hsu | 345/164 |

* cited by examiner

CUSTOMIZABLE COMPUTER INPUT DEVICE

FIELD OF THE INVENTION

The present invention relates generally to the field of computer peripherals, and more particularly to user input devices such as the computer mouse.

BACKGROUND OF THE INVENTION

Currently, most computer mice have optical/laser based sensors. Older or more conventional units feature mechanical type balls. All of these interpret a user's movement and send associated signals to a host device. Mice also comprise one or more buttons and potentially other input controls such as scroll wheels/tilt wheels and programmable buttons to accept user input. The mouse may be directly connected to the host computer via a wire or wirelessly through radio, I/R or some other method.

Typically, the most expensive components in a mouse are the microcontroller, the optical/laser sensor and the wireless transmission component (if any).

A user typically must select from several pre-determined shapes provided by the mouse manufacturer.

This necessitates most manufacturers making several mice to suit the requirements of various users, even though each mouse with different shapes may have common internal components (i.e., the microcontroller, sensor and wireless component).

In order to provide users with different ergonomic designs and functionality while sharing the common internal components, existing approaches include:
1. "Mini mouse"—A very small mouse, which accepts larger cases on top. The limitation of this is that there is not much flexibility, the additional cases merely ride piggy back and the larger mouse buttons simply actuate the existing "Mini mouse" button. This tends to lead to mechanical inaccuracy and requires parts to be manufactured to extremely high tolerances, which may not be cost effective.
2. "Multi-case mouse"—This design has either multiple top covers meant to fit onto one existing bottom cover, or the internal PCB is designed to be unscrewed from one case and screwed into another case. The disadvantage here is that in a multiple top cover design, the range of possible top cover shapes is limited by the existing button and scroll wheel positions of the bottom cover. There is also some danger since the internal circuitry is not shielded from the lay user who may accidentally damage it when changing cases.

SUMMARY OF THE INVENTION

An improved user input device is disclosed having modular system wherein the most expensive components may be collected in a core module.

This core module can house the sensor, microcontroller and RF modules, if any. It may also house the microswitches and scroll wheel that can be actuated when using the external case.

A specially adapted connector is utilized to allow the core module to accept mouse button inputs from an interchangeable case, power from a battery pack (if required for wireless operation) and control lights or any other input/output features on the mouse itself.

The core module can also accept the connection to the host computer, either through the module connector or directly via USB or similar industry standard connector.

A person of skill in the art will appreciate that while the specification discusses the present invention in the context of the computer mouse, other computer input devices, including joysticks, game pads, and the like, can also benefit from the modular approach described herein.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein.

Figure 1:
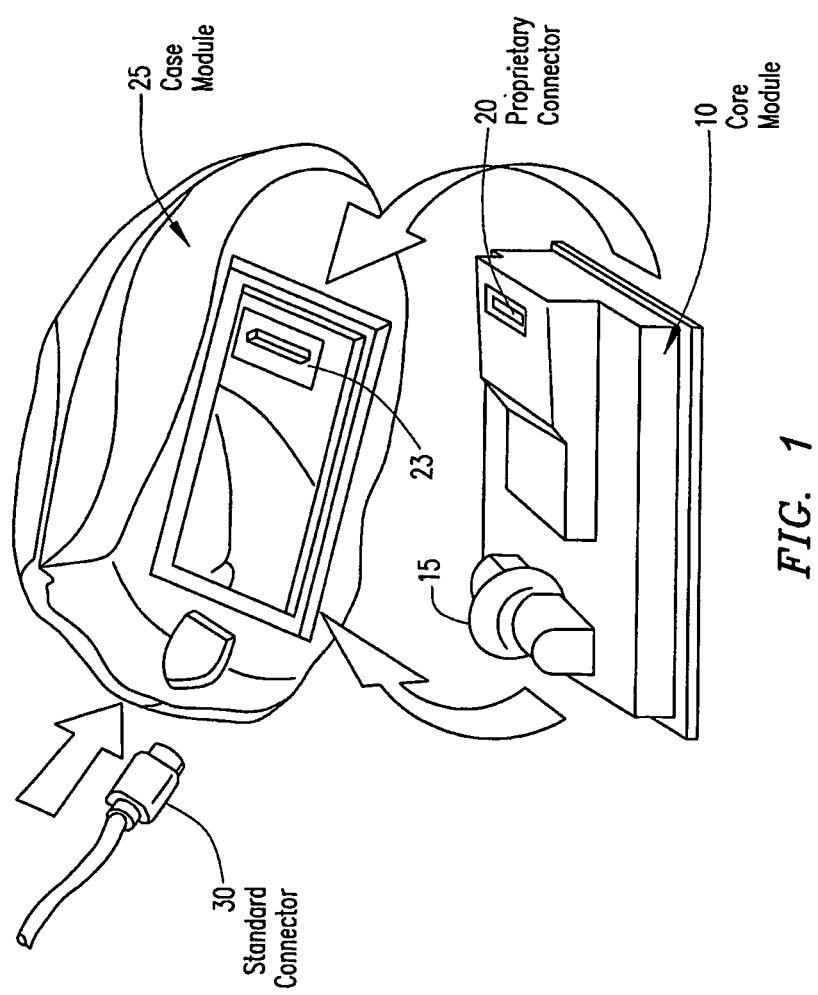
FIG. 1 illustrates a perspective view of a detached core module and case module.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As summarized above, embodiments of the invention provide a computer input device such as a mouse having a modular capability.

Referring to FIG. 1, a "core module" 10 houses the sensor, microcontroller and RF modules, if any (interior circuitry not shown). It may or may not also house the microswitches and scroll wheel 15 that can be actuated upon assembly with a case module.

In a preferred embodiment, the unit comprises a case module connector 20 that will allow it to accept mouse button inputs from an interchangeable case (a "case module") 25, power from a battery pack (if required for wireless operation) and control lights or any other input/output features on the mouse itself.

The core module also 10 accepts the connection to the host computer, either through the case module connector 20 or directly via USB or similar industry standard connector 30.

Figure 2:
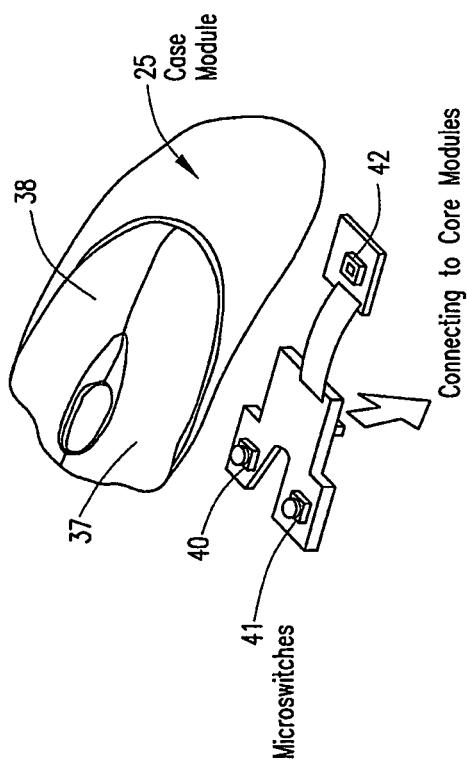
FIG. 2 illustrates a top-down view of a case module and a cutaway view of the case module showing switches and the core module connector.

Referring now to FIG. 2, the case module 25 share comprises a core module connector 23 that will allow them to interface with an appropriately designed core module having a corresponding case module connector. Case module 25 may have a differing number of buttons 37, 38, and may include the microswitches 40, 41, 42 in the case itself. Case modules may also have battery packs in order to power wireless versions of core modules.

Figure 3:
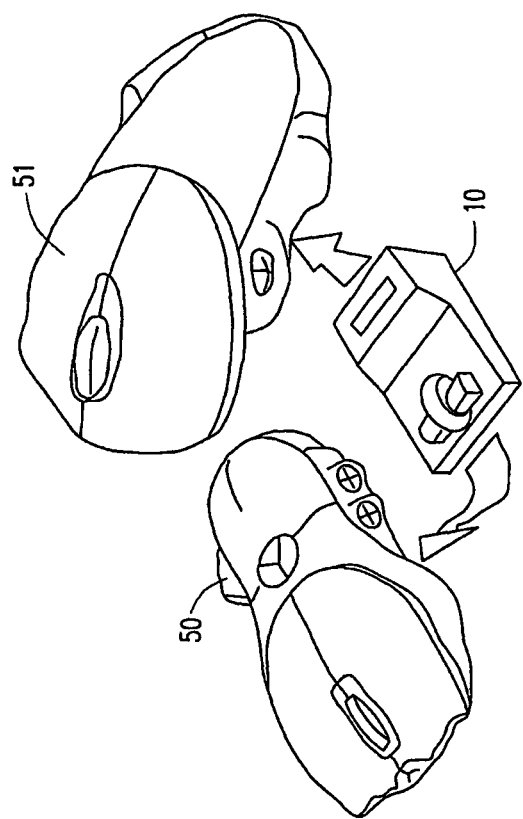
FIG. 3 illustrates a swapping of case modules in accordance with one aspect of the present invention.

FIG. 3 depicts an exchange of case modules 50, 51 for core module 10. As the different case modules 50, 51 are mated with core module 10, the user need not be exposed to the internal circuitry of the mouse. This modular system allows for great flexibility in the cases (e.g. batteries, lights, numbers of buttons, ergonomic shape) without exposing the lay end user to sensitive components in the mouse itself.

This invention enables thus users to use a single core module, and then mix and match with inexpensive case modules to suit their individual preferences, or for a user to use the same case module with a wired or wireless core module (e.g., keeping the same familiar shape and using one or the other depending on prevailing user requirements).

Figure 4:
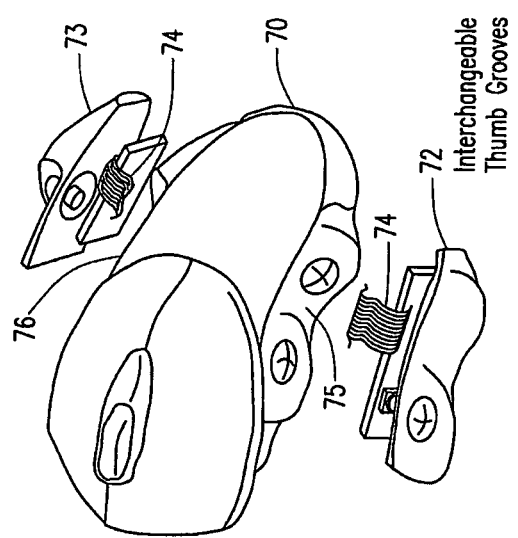
FIG. 4 depicts an alternative embodiment of a computer mouse case having selectively detachable thumb grooves.

In an alternative embodiment shown in FIG. 4, the case module 70 is modifiable to allow for left or right-handed use. An otherwise conventional case can be adapted to allow interchangeable thumb grooves 72, 73 and buttons on the right and left side of the mouse. Thumb grooves 72, 73 may be mechanically inserted into corresponding slots 75, 76.

In this way, the mouse may be converted from a right handed to left handed mouse by changing the thumb groove. The thumb groove area may have buttons that are connected to the mouse (or case module) via a small cable 74, so that when right or left thumb grooves are used, the corresponding buttons are also shifted from right to left.

An advantage of the preceding embodiment describing the thumb groove approach instead of swapping the entire mouse case is that if a modular system is not used, it is still possible for a user to customize a mouse from right handed to left handed versions easily at a relatively low cost.

Figure 5:
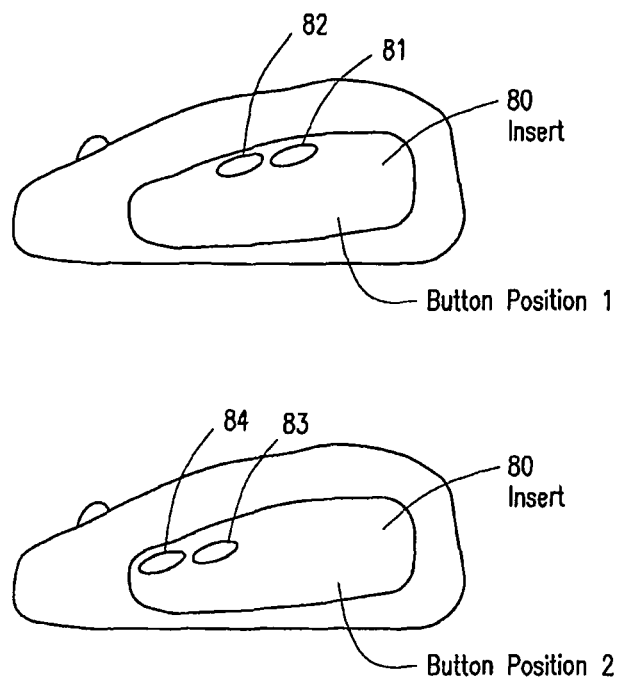
FIG. 5 shows an alternative embodiment of selectively detachable thumb grooves with buttons of differing configurations.

In yet another embodiment depicted in FIG. 5, replaceable right or left handed thumb grooves may have built-in side buttons in various positions. For example, the user may be supplied with two or more side thumb grooves that have side button(s) in differing numbers and different positions (e.g., with buttons more forward or back, or differently spaced). Insert 80 may thus be configured with neutral position buttons 81, 82, forward position buttons 83, 84 or buttons of other desired configurations The user may then select which side thumb groove to use, hence adjusting the mouse side buttons to best fit his needs. This addresses a long standing problem of users who find that the side buttons are either inadequate in number or not properly positioned for comfortable use.

A mouse according to this embodiment may have a left hand customizable side thumb groove so that only the side button numbers and position are changed depending on the user's needs, or it may be part of an entire system with complete modular changes on both right and left sides of the mouse. In the former case, the purpose of changing the thumb grooves is specifically to customize and adjust the side buttons, in which case it acts as a customizable side button system, as shown in FIG. 5.

Figure 6:
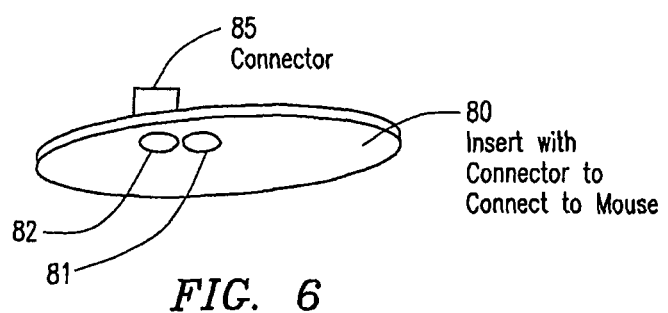
FIG. 6 depicts an electrical connection for the thumb grooves with buttons as shown in FIG. 5.

FIG. 6 illustrates a preferred connection method via a standard electrical contact connector 85 for connecting the side buttons (although a person of ordinary skill in the art will recognize that other connection methods may be used). Note that in this embodiment, the microswitches for the side buttons may be contained in the customizable insert rather than in the main body of the mouse. Alternatively, the microswitches may also be housed in the mouse instead and be actuated mechanically by the customizable insert instead.

Note that the above descriptions can be beneficially applied to other user input devices such as trackballs, game pads and the like.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A user-customizable computer mouse for providing a plurality of user-customizable configurations, comprising:
   a core module comprising:
     a sensor;
     a microcontroller; and
     a case module connector;
   a case module comprising:
     an exterior case having a left side and a right side, wherein said exterior case comprises a side slot located on any one of said left side and said right side of said exterior case;
     a core module connector configured for detachable mating engagement with said case module connector of said core module;
   a first thumb groove configured for detachable mating engagement with said side slot, said first thumb groove, and having a number of side buttons in a first configuration; and
   a second thumb groove configured for detachable mating engagement with said side slot, said second thumb groove having a number of side buttons in a second configuration,
   wherein said first thumb groove and said second thumb groove are selectively attached to said side slot to form a portion of the any one of said left side and right side of the exterior case, and for use with said computer mouse,
   wherein mounting of said case module onto said core module enables detachable mating engagement of said case module connector and said core module connector and an electrical coupling therefrom,
   wherein said mating engagement of said case module connector and said core module connector enables signal transfer of at least one of mouse input signals and mouse output signals between said number of side buttons of said attached first or second thumb groove and said core module,
   wherein said core module, said case module and said first side thumb groove and said second side thumb groove enable a plurality of user-customizable computer mouse configurations.

2. The user-customizable computer mouse of claim 1, wherein said exterior case further comprises a thumb groove connector, and wherein said number of side buttons of said attached first or second thumb groove are electrically coupled to said thumb groove connector.

3. The user-customizable computer mouse of claim 2, wherein said thumb groove connector creates a signal path between said number of side buttons of said attached first or second thumb groove and said microcontroller via said core module connector and said case module connector.

4. The user-customizable computer mouse of claim 3, wherein said thumb groove connector, said core module connector and said case module connector provide a plurality of signal paths between said number of side buttons of said attached first or second thumb groove and said core module.

5. The user-customizable computer mouse of claim 1, further comprising a plurality of microswitches for electrically coupling to said number of side buttons.

6. The user-customizable computer mouse of claim 5, wherein said microswitches are disposed within said first thumb groove and said second thumb groove.

7. The user-customizable computer mouse of claim 5, wherein said microswitches are disposed within said exterior case.

8. The user-customizable computer mouse of claim 1, wherein said case module connector is configured to enable said core module to interchangeably couple to a first case module and a second case module and wherein said first case module differs from said second case module in one of a computer mouse input feature and a computer mouse output feature and an ergonomic shape.

9. The user-customizable computer mouse of claim 1, wherein said case module comprises at least one of a mouse button to receive inputs from a user, a battery pack configured to provide power to said core module, and a light feature configured to emit light.

10. A user-customizable input device for providing a plurality of user-customizable configurations, comprising:
   a core module comprising:
      a sensor:
      a microcontroller; and
      a case module connector;
   a case module comprising:
      an exterior case having a left side and a right side, said exterior case comprising a left side slot located on the left side of the exterior case, and a right side slot located on the right side of the exterior case;
      a core module connector configured for detachable mating engagement with said case module connector of said core module;
      a first left thumb groove configured for selective detachable mating engagement with said left side slot, said first left thumb groove having a number of side buttons in a first configuration; and
      a second left thumb groove configured for selective detachable mating engagement with said left side slot, said second left thumb groove having a number of side buttons in a second configuration,
      a first right thumb groove configured for selective detachable mating engagement with said right side slot, said first right thumb groove having a number of side buttons in a third configuration; and
      a second right thumb groove configured for selective detachable mating engagement with said right side slot, said second right thumb groove having a number of side buttons in a fourth configuration,
   wherein any one of said first left thumb groove and said second left thumb groove is selectively attached to said left side slot to form a portion of the said left side of the exterior case, and any one of said first right thumb groove and said second right thumb groove is selectively attached to said right side slot to form a portion of the said right side of the exterior case,
   wherein mounting of said case module onto said core module enables detachable mating engagement of said case module connector and said core module connector and an electrical coupling therefrom,
   wherein mating engagement of said case module connector and said core module connector enables signal transfer of at least one of mouse input signals and mouse output signals between said side buttons on said attached first or second left thumb groove and said attached first or second right thumb groove and said core module,
   wherein said core module, said case module and said first left thumb groove, said second left thumb groove, said first right thumb groove and said second right thumb groove enable a plurality of user-customizable input device configurations.

11. The user-customizable input device of claim 10, wherein said exterior case further comprises a left thumb groove connector and a right thumb groove connector, and wherein said left thumb groove connector and said right thumb groove connector create a signal path between said number of side buttons on said attached first or second left thumb groove and said attached first or second right thumb groove and said microcontroller via said core module connector and said case module connector.

12. The user-customizable input device of claim 10, further comprising a plurality of microswitches for electrically coupling to said number of side buttons.

13. The user-customizable input device of claim 12, wherein said microswitches are disposed within said first left thumb groove, said second left thumb groove, said first right thumb groove and said second right thumb groove.

14. The user-customizable input device of claim 12, wherein said microswitches are disposed within said exterior case.

* * * * *